United States Patent
Klein et al.

(10) Patent No.: US 9,141,529 B2
(45) Date of Patent: Sep. 22, 2015

(54) METHODS AND APPARATUS FOR PROVIDING ACCELERATION OF VIRTUAL MACHINES IN VIRTUAL ENVIRONMENTS

(75) Inventors: Yaron Klein, Raanana (IL); Allon Leon Cohen, Modin (IL); Gary James Calder, Eastleigh (GB); Franz Michael Schuette, Colorado Springs, CO (US)

(73) Assignee: OCZ Storage Solutions Inc., San Jose, CA (US)

( * ) Notice: Subject to any disclaimer, the term of this patent is extended or adjusted under 35 U.S.C. 154(b) by 177 days.

(21) Appl. No.: 13/584,867

(22) Filed: Aug. 14, 2012

(65) Prior Publication Data
US 2014/0052892 A1    Feb. 20, 2014

(51) Int. Cl.
G06F 12/00    (2006.01)
G06F 12/02    (2006.01)
G06F 12/08    (2006.01)
G06F 9/455    (2006.01)

(52) U.S. Cl.
CPC ........ G06F 12/0246 (2013.01); G06F 9/45558 (2013.01); G06F 12/0866 (2013.01); G06F 2009/45579 (2013.01); G06F 2212/151 (2013.01); G06F 2212/222 (2013.01)

(58) Field of Classification Search
CPC ............ G06F 12/0246; G06F 9/45558; G06F 12/0866; G06F 2009/45579; G06F 2212/151; G06F 2212/222
See application file for complete search history.

(56) References Cited

U.S. PATENT DOCUMENTS

| | | | | |
|---|---|---|---|---|
| 3,806,878 A | * | 4/1974 | Edstrom | 714/46 |
| 5,483,468 A | * | 1/1996 | Chen et al. | 702/186 |
| 5,581,600 A | * | 12/1996 | Watts et al. | 379/88.02 |
| 5,581,736 A | * | 12/1996 | Smith | 711/170 |
| 2005/0060495 A1 | * | 3/2005 | Pistoulet | 711/118 |
| 2006/0259731 A1 | * | 11/2006 | Oshins et al. | 711/173 |
| 2007/0283348 A1 | * | 12/2007 | White | 718/1 |
| 2011/0184993 A1 | * | 7/2011 | Chawla et al. | 707/802 |
| 2011/0265083 A1 | * | 10/2011 | Davis | 718/1 |
| 2011/0296406 A1 | * | 12/2011 | Bhandari et al. | 718/102 |
| 2011/0314224 A1 | * | 12/2011 | Piry et al. | 711/118 |
| 2012/0210066 A1 | * | 8/2012 | Joshi et al. | 711/118 |
| 2012/0221807 A1 | * | 8/2012 | Wade et al. | 711/154 |
| 2012/0245897 A1 | * | 9/2012 | Bose et al. | 702/186 |
| 2013/0111474 A1 | * | 5/2013 | Agarwal et al. | 718/1 |

OTHER PUBLICATIONS

Vaghani, S.B., VMware, Inc. "Virtual Machine File System." ACM SIGOPS OS Review, vol. 44, No. 4, pp. 57-70, Dec. 2010.*

* cited by examiner

*Primary Examiner* — Cheng-Yuan Tseng
*Assistant Examiner* — Alan Otto
(74) *Attorney, Agent, or Firm* — Hartman Global IP Law; Gary M. Hartman; Michael D. Winter

(57) ABSTRACT

A host server computer system that includes a hypervisor within a virtual space architecture running at least one virtualization, acceleration and management server and at least one virtual machine, at least one virtual disk that is read from and written to by the virtual machine, a cache agent residing in the virtual machine, wherein the cache agent intercepts read or write commands made by the virtual machine to the virtual disk, and a solid state drive. The solid state drive includes a non-volatile memory storage device, a cache device and a memory device driver providing a cache primitives application programming interface to the cache agent and a control interface to the virtualization, acceleration and management server.

34 Claims, 14 Drawing Sheets

METHODS AND APPARATUS FOR PROVIDING ACCELERATION OF VIRTUAL MACHINES IN VIRTUAL ENVIRONMENTS

BACKGROUND OF THE INVENTION

The present invention generally relates to virtual machine acceleration in virtual environments and, more particularly, applying a non-volatile memory-based cache architecture in a hypervisor environment.

Data center virtualization technologies are now well adopted into information technology infrastructures. As more and more applications are deployed in a virtualized infrastructure, there is a growing need for performance acceleration, virtualization services and business continuity in various levels.

A virtual server is a type of virtual machine, which as used herein refers to software that executes programs like a physical machine. Virtual servers are logical entities that run as software in a server virtualization infrastructure, referred to as a "hypervisor" or a virtual machine manager. A hypervisor provides storage device emulation, referred to as "virtual disks", to virtual servers. Hypervisors implement virtual disks using back-end technologies, such as files on a dedicated file system, or raw mapping to physical devices.

Whereas physical servers run on hardware, virtual servers run their operating systems within an emulation layer that is provided by a hypervisor. Virtual servers may be implemented in software to perform the same tasks as physical servers. Such tasks include, for example, running server applications, such as database applications, customer relation management (CRM) applications, email servers, and the like. Most applications that run on physical servers are portable to run on virtual servers. Within the context of virtualization, one distinction should be mentioned for clarification purposes, which is, the distinction between virtual desktops and virtual servers: virtual desktops run client side applications and service individual users, whereas virtual servers run applications that service multiple and potentially large numbers of clients.

The goal of virtual servers is to provide high performance, high availability, data integrity and data continuity. Virtual servers are dynamic in the sense that they may be moved from one host server computer system to another. This also entails that on a single host server computer system the number of virtual servers may vary over time since virtual machines can be added and removed from the host server computer system at any time.

As computing resources, such as CPU and memory, are provided to the virtual server by the hypervisor, the main bottleneck for the virtual server's operation resides in the storage path. Hard disk drives (HDDs) in particular, being electro-mechanical devices with all their known drawbacks, are hampered by low performance, especially in random pattern workload situations due to their rotational and seek latencies.

A solid-state drive (SSD) is a drive that uses solid-state technology to store its information and provide access to the stored information via a storage interface. The most common SSDs use NAND flash memory arrays to store the data and a controller serving as the interface between the host server computer system and the NAND flash memory array. Such a controller can use internal DRAM or SRAM memory, battery backup, and other elements.

In contrast to a magnetic hard disk drive, a non-volatile memory-based storage device (SSD or raw flash, for example, direct memory mapped rather than a block device behind a SATA interface) is an electronic device and does not contain any moving parts. As a result, seek and rotational latencies inherent in hard disk drives are almost completely eliminated in non-volatile memory-based storage devices resulting in read and write requests being serviced in an immediate operation. Thus, a flash-based device has greatly improved performance over hard disk drives, especially in an environment defined by mostly small read and write operations with random patterns.

Due to the much higher cost of non-volatile memory-based storage and limited data retention relative to magnetic hard disks, back end storage mainly uses magnetic hard disks as the primary storage tier. However, non-volatile memory-based storage acceleration is achieved in the storage level, for example, by means of caching or tiering mechanisms.

Conventional virtualization acceleration systems for disk I/O are often implemented at the physical disk level, which means they are not specifically designed to handle the demands by the virtualization paradigm, for the simple reason that they are not implemented at the hypervisor level. Consequently, these systems are not fully virtualization aware. More specifically, acceleration implemented outside the hypervisor environment suffers from inefficiency, lack of coordination between the services, multiple services to manage and recover, and lack of synergy. Therefore, it is advantageous to establish a unified environment of acceleration in the hypervisor which is much more efficient, simpler to manage, and dynamically adaptive to the changing virtual machine storage needs and synergy.

Furthermore, commonly, the main storage is located outside the physical server in a storage area network (SAN) or network attached storage (NAS) configuration to allow for multiple accesses by all physical servers and allow migration of the virtual machine. In contrast, non-volatile memory-based storage devices for caching can be placed in the physical server itself, thus providing faster access to the media with lower latency due to the short distance compared to the external storage. The capacity of the cache is limited due to its location on the physical server. Therefore, efficient caching algorithms must make complex decisions on what part of the data to cache and what not to cache. In order to be successful, these advanced algorithms for caching also require the collection of storage usage statistics over time for making an informed decision on what to cache and when to cache it.

A major aspect in virtual environment acceleration compared to a physical environment (i.e., single server) is its heterogeneous nature. Because of the plurality of virtual machines, different workload peak times coincide with different workload patterns and different service levels required. For example, a virtual environment can host a database for transaction processing during the day, and switch to database analysis for the night in addition to virtual desktops that boot together at the start of a shift and so on. As a result, virtual environment caching should support multiple, diverse modes of acceleration, while providing shared and dynamic resources for different applications at different times.

In view of the above, it can be appreciated that there are certain problems, shortcomings or disadvantages associated with the prior art, and that it would be desirable if an improved system and method were available for virtual machine acceleration in virtual environments that implements cache mechanisms on the hypervisor level and implements efficient cache algorithms.

BRIEF DESCRIPTION OF THE INVENTION

The present invention provides systems and methods suitable for improved virtual machine acceleration in virtual environments by implementing cache mechanisms on a hypervisor level with efficient caching algorithms.

According to a first aspect of the invention, a system is provided that includes a host server computer system including a hypervisor within a virtual space architecture running at least one virtualization, acceleration and management server and at least one virtual machine, at least one virtual disk that is read from and written to by the virtual machine, a cache agent residing in the virtual machine and adapted to intercept read or write commands made by the virtual machine to the virtual disk, and a solid state drive. The solid state drive includes a non-volatile memory storage device, a cache device and a memory device driver providing a cache primitives application programming interface to the cache agent and a control interface to the virtualization, acceleration and management server.

According to a second aspect of the invention, a method is provided that uses accelerating, migrating and synchronizing virtual machines across a network of functionally connected host server computer systems. Each host server computer system includes a hypervisor within a virtual space architecture with at least one virtual machine, at least one virtualization, acceleration and management server to accelerate the virtual machine, a virtual disk to be written to and read from by the virtual machine, a cache agent residing in the virtual machine and operating to intercept read or write commands made by the virtual machine to the virtual disk, and a solid state drive including a non-volatile memory storage device, a cache device and a memory device driver to provide access to the solid state drive by the hypervisor and cache primitives application programming interface. The method includes first detecting migration of the virtual machines from a first host server computer system to a second host server computer system. Next, the second host server computer system is informed of the migration of the virtual machines. Cache invalidation of the virtual machines that migrated from the first host server computer system to the second host server computer system is then performed and cache from the first host server computer system is transferred to the second host server computer system.

According to a third aspect of the invention, a system is provided that includes at least two host server computer systems interconnected by a network. Each host server computer system includes a hypervisor within a virtual space architecture running at least one virtualization, acceleration and management server, at least one virtual machine, at least one virtual disk that is read from and written to by the virtual machine, a cache agent residing in the virtual machine and adapted to intercept read or write commands made by the virtual machine to the virtual disk, and a solid state drive that includes a non-volatile memory storage device, a cache device and a memory device driver providing a cache primitives application programming interface to the cache agent and control interface to the virtualization, acceleration and management server. The virtualization, acceleration and management server is adapted to functionally couple any two of the host server computer systems to synchronize migration of the virtual machine and the virtual disk from one host server computer system to another host server computer system while maintaining the coherency of the cache devices in the two host server computer systems.

A technical effect of the invention is the ability to establish a unified environment of virtual machine acceleration in virtual environments that is implemented in the hypervisor level.

Other aspects and advantages of this invention will be better appreciated from the following detailed description.

DETAILED DESCRIPTION OF THE INVENTION

Figure 1:
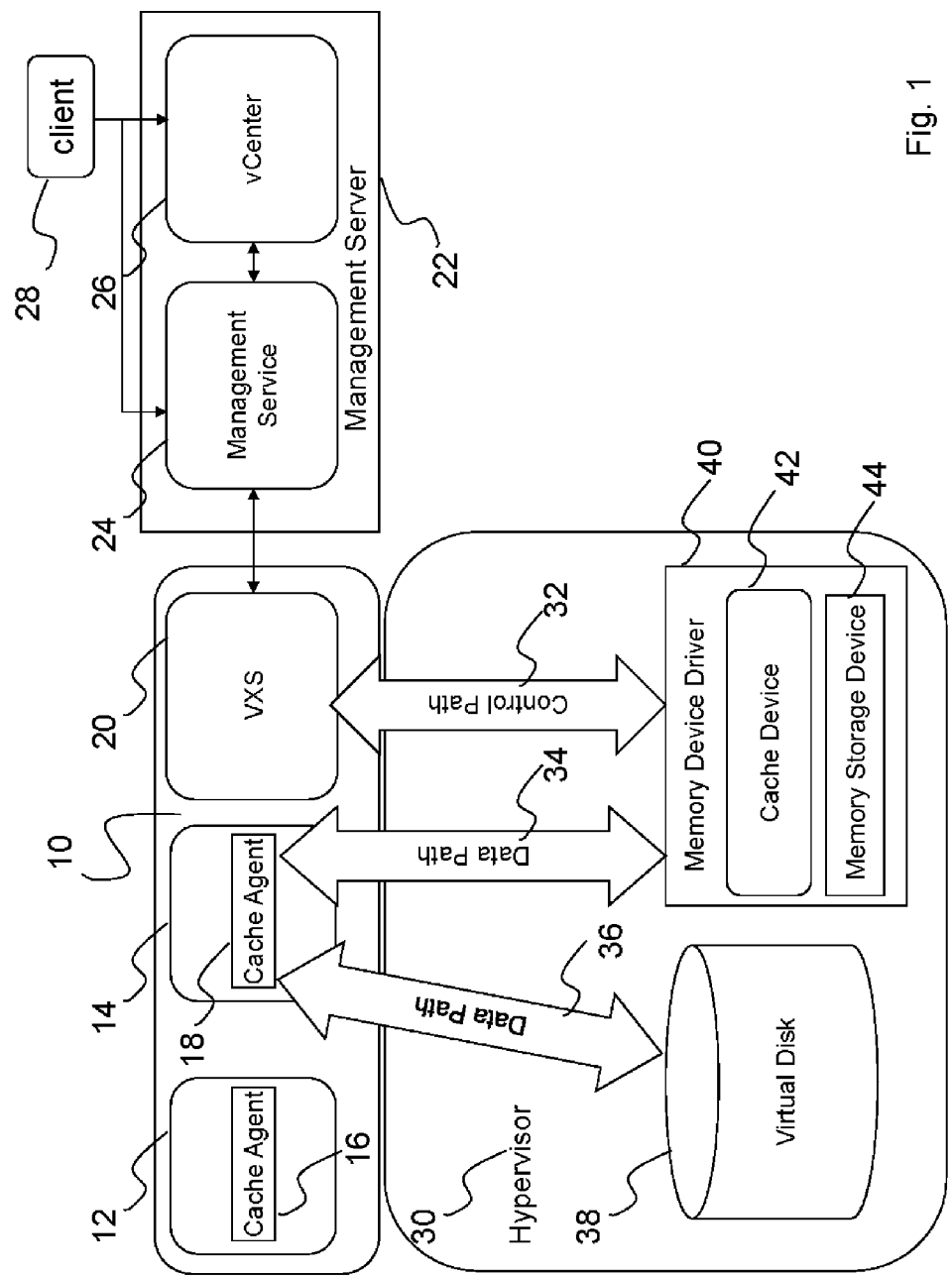
FIG. 1 is a simplified block diagram representing components in a hypervisor's virtual space architecture in accordance with an aspect of the present invention.

FIG. 1 illustrates a simplified block diagram of a hypervisor's virtual space architecture 10 including a hypervisor 30 running a plurality of accelerated virtual machines 12 and 14, in this case at least two virtual servers, and a virtualization, acceleration and management server (VXS) 20. The virtual space architecture is run on a host server computer system.

Each accelerated virtual machine 12 and 14 includes a cache agent 16 and 18, respectively. The cache agents 16 and 18 are software modules that reside in a guest's operating system (OS). More specifically, the cache agents 16 and 18 are a software layer in the OS kernel (e.g., Windows® kernel or Linux® kernel). The cache agents 16 and 18 analyze and execute read and write commands made by the virtual machines 12 and 14, respectively.

In a non-limiting example, the cache agents 16 and 18 can reside in the kernel below the file system and on top of a SCSI driver. For example, in a Windows® OS, it can reside below the NTFS module and on top of the StorPort module with Windows® standard application programming interface (API). In a Linux® OS, it can reside below a File System module (e.g., etx3 or etx4) and on top of the block I/O module. In both examples, the API to the cache agents 16 and 18 comprise SCSI command descriptor blocks (CDB) of block device commands according to the SCSI architecture model (SAM) as defined in SCSI block command (SBC) and SCSI primary command (SPC). This allows the cache agents 16 and 18 to provide block level acceleration. Alternatively, the cache agents 16 and 18 can reside on top of the file system in the OS kernel. For example, in a Windows® OS, it can reside between the IO Manager module and the NAS file system (CIFS or NTFS) module. In a Linux® kernel, it can reside between the virtual file system (VFS) and the NFS or file system (etx3, etx4 or else). Hence, this location enables file system acceleration as well as NAS acceleration.

The accelerated virtual machines 12 and 14 with their respective cache agents 16 and 18 may be functionally equivalent and therefore, for convenience purposes, the embodiment of the present invention represented in FIG. 1 will be described herein generally with reference only to the accelerated virtual machine 14 and its respective cache agent 18. As represented in FIG. 1, the cache agent 18 is connected to two types of storage devices, a virtual disk 38 which is a virtual storage entity created from a physical storage device (SAN or NAS) and a solid state drive (SSD) 40 which comprises at least one non-volatile memory storage device 44, preferably a NAND flash-based memory device, combined with a memory device driver and a cache device 42 which is a logic element for processing the caching primitives and implementing caching algorithms that provides access interface and cache functionality. The memory device driver may provide a cache primitives application programming interface to the cache agent 18 and a control interface to the VXS 20.

The cache device 42 may provide an interface of the block device according to SPC and SBC standards as well as a cache device interface via vendor specific commands.

The cache agent 18 is connected to the virtual disk 38 via a data path 36 and the cache device 42 via a data path 34. This allows transfer of data between the cache agent 18 and the virtual disk 38 and SSD 40. The cache agent 18 may be adapted to accelerate operation of the virtual machine 14 by using the memory device 44 for caching data read from the virtual disk 38 in the SSD 40, retrieving cached data, caching data written to the virtual disk 38 in the SSD 40 and writing data to the virtual disk 38.

The VXS 20 is a virtual machine that runs on the host server computer system where the accelerated virtual machines 12 and 14 are located. The VXS 20 is connected to the cache device 42 to receive and send metadata information through control path 32 to and from the cache device 42 via SCSI vendor specific commands.

The VXS 20 may also be used to process metadata information for the cache device 42 and send the results back to the cache device 42. In this case, the VXS 20 processes offline information like histograms and hot zones and makes this information available to the cache device 42.

Alternatively, the VXS 20 receives management directives from a management service 24 and passes them to the cache device 42. Hence, the VXS 20 acts as a management gateway. Such directives can be management directives (e.g., firmware upgrade) or cache related directives (e.g., stop accelerate).

In a specific aspect of the invention, the VXS 20 may be configured to communicate with another VXS in another host server computer system across a network. Via this communication, once migration of the accelerated virtual machine 14 from one host server computer system to another is detected, the VXS 20 can inform another VXS of the migration and hence perform and coordinate actions of validation (flush) of non-relevant virtual machines (servers that migrated to another host server computer system) and cache transfer (transfer cache from the original host server computer system to the destination host server computer system).

The management service 24 may be run on a management server 22 which is connected to a vCenter 26 in a VMWare environment. The management service 24 can retrieve information from the vCenter 26 regarding the virtual environment. The management service 24 also has a user interface that communicates with a client 28 that enables a user to manage the virtual environment.

In a specific aspect of the invention, the management service 24 detects migration of virtual machines (V-Motion) from one host server computer system to another via the vCenter 26. In this case, the management service 24 is responsible to invalidate (flush) the cache information (data and metadata) from the old host server computer system to maintain coherency of cache.

The management service 24 may be adapted to connect to any management server in another hypervisor environment, or act on its own to provide central management services.

Figure 2:
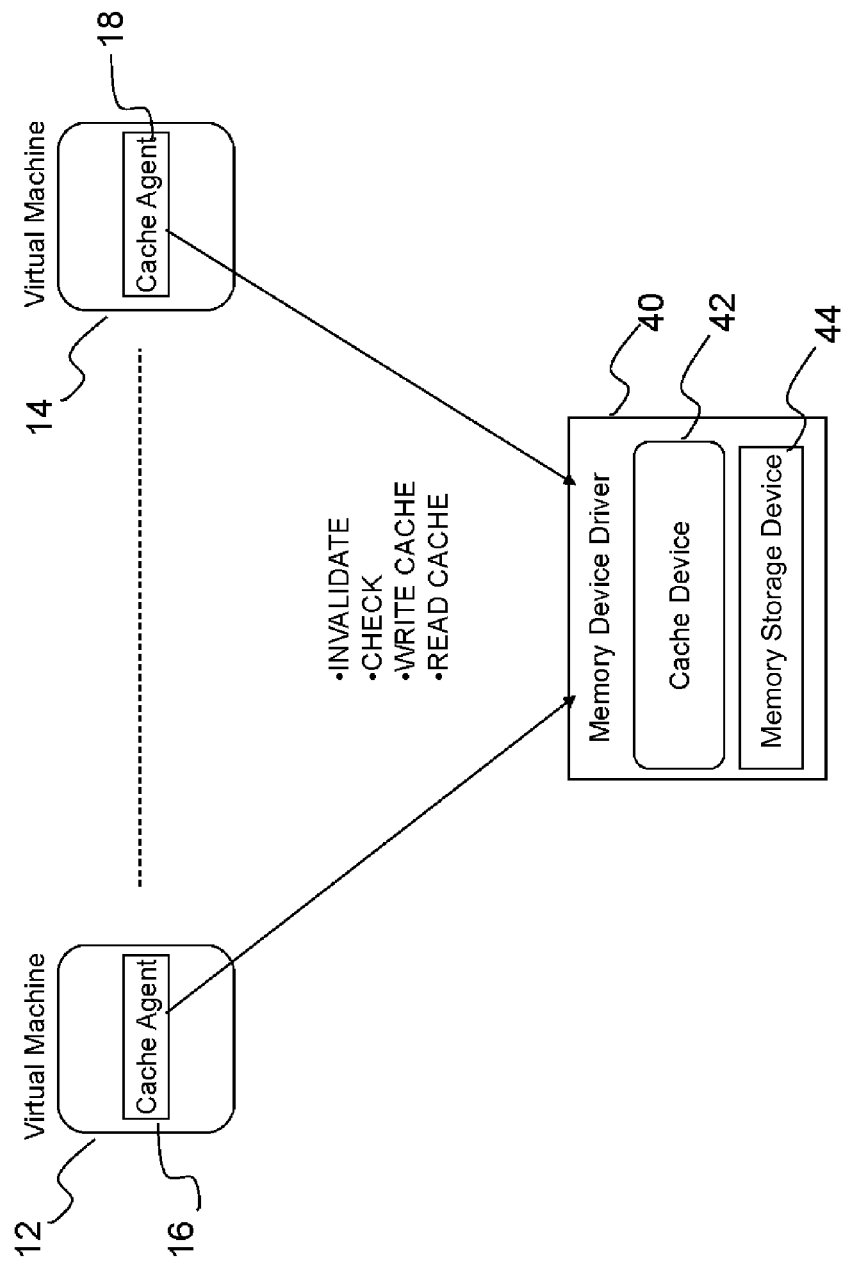
FIG. 2 is a block diagram representing communications between cache agents and a shared cache in accelerated virtual machines in accordance with an aspect of the present invention.

FIG. 2 illustrates a simplified block diagram representing communications between the cache agents 16 and 18 that reside in the virtual machines 12 and 14, respectively, and the SSD 40 that implements a shared cache entity, that is, the SSD 40 is accessible by all virtual machines across a plurality of hypervisors. For convenience, consistent reference numbers are used throughout the drawings to identify the same or functionally equivalent elements. The cache agents 16 and 18 interact with the cache device 42 and the non-volatile memory storage device 44 via INVALIDATE, CHECK, WRITE CACHE and READ CACHE primitives, carried over vendor specific block (SCSI) commands.

The INVALIDATE primitive invalidates cache information from the cache device 42. The command terminates after the data and metadata related to the requested data segment from the logical space are no longer valid in the cache device 42.

The CHECK primitive checks if a data segment from the logical space or part of the data segment is valid in the cache device 42. The command returns with a map of the available parts of the requested segment that are available in the cache device 42.

The WRITE CACHE primitive asks to place a data segment from the logical space into the cache device 42. There is no guarantee, however, that the data will be placed in the cache device 42.

The READ CACHE primitive attempts to read a data segment from the logical space if it, or part of it, resides in the cache device 42. The cache device 42 returns the available parts from the requested segment from the logical space if available.

Figure 3:
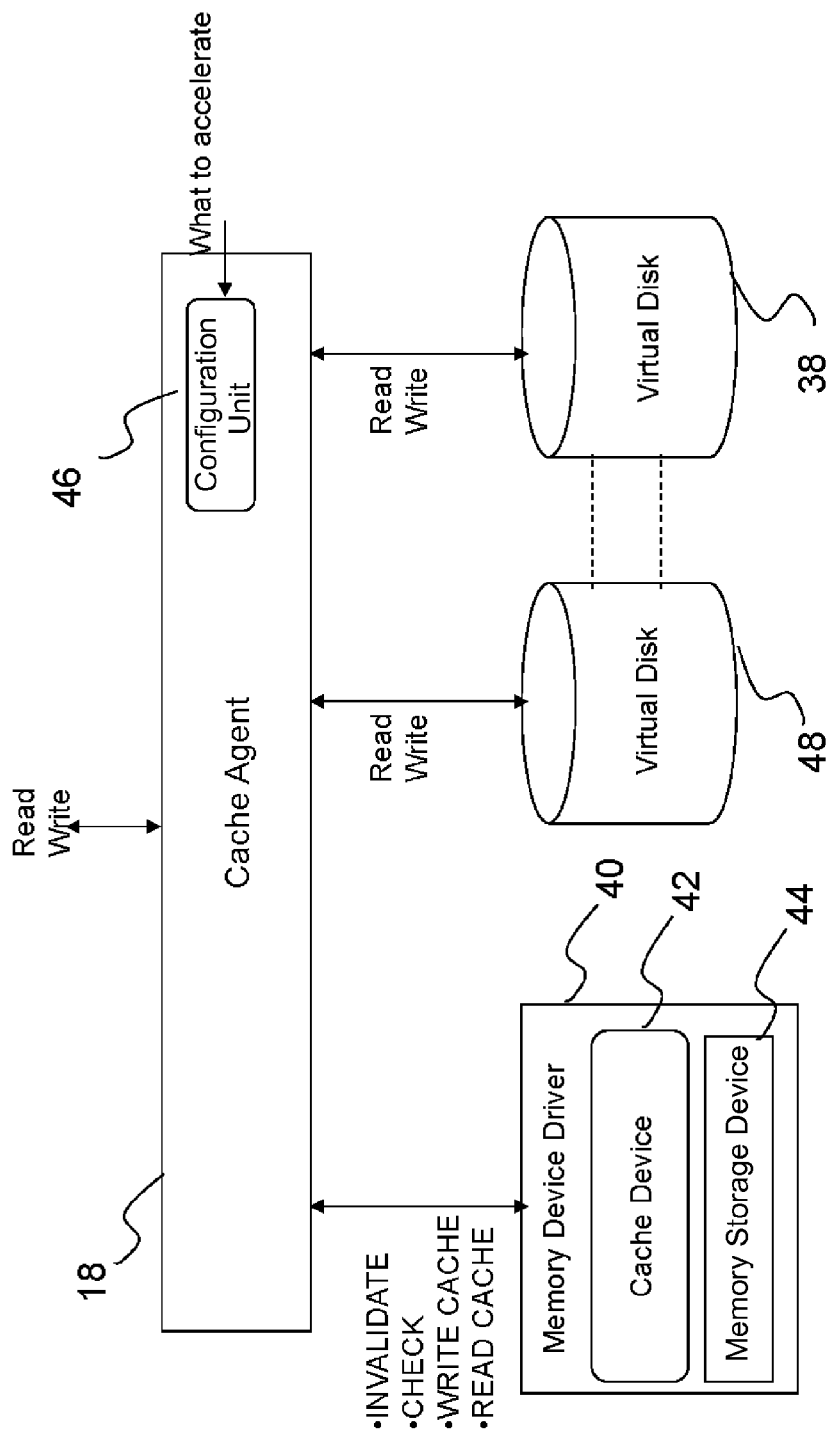
FIG. 3 is a block diagram representing connectivity communications of a cache agent in accordance with an aspect of the present invention.

FIG. 3 is a simplified block diagram of the cache agent 18 representing communication flow from an upper layer toward storage and cache devices. The cache agent 18 communicates with the shared cache entity through the SSD 40 using cache primitives and with the virtual disks 38 and 48 via standard block device commands. The cache agent 18 further contains a configuration unit 46 to indicate which volumes of virtual disks 38 and 48 (from the assigned disks to the virtual machine 12 and 14) to accelerate. As typically used in the art, the term volume refers herein to a logical drive or logical unit that is similar to a partition of a drive (it can be a partition but a partition does not have to be a logical unit or volume). The volume is visible to the file system and there may be several volumes on virtual disks 38 and 48.

The cache agent 18 may be adapted to be transparent to incoming commands for non-accelerated virtual disks 38 and 48 and pass the commands as-is toward and from them.

For local accelerated virtual disks 38 and 48, that is, virtual disks 38 and 48 that are running on the same physical sever, the cache agent 18 may use the SSD 40 to retrieve data (if they exist) and hence use a faster media to increase performance of the accelerated virtual disks 38 and 48. The cache agent 18 also updates data in the SSD 40 to increase the chance of a "hit", i.e., retrieving required data from the cache.

Figure 4:
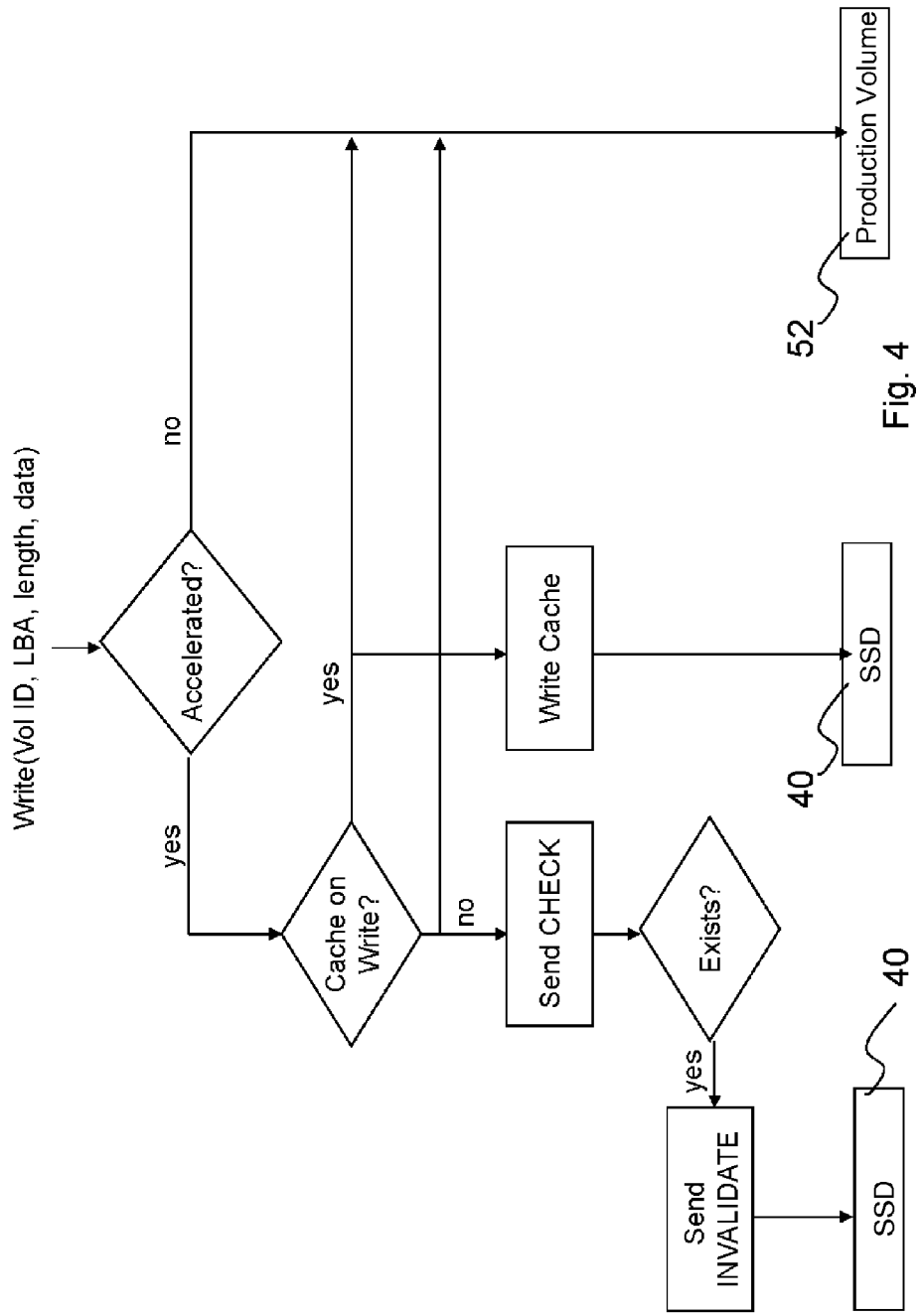
FIG. 4 is a flow chart representing a write operation in a cache agent in accordance with an aspect of the present invention.

FIG. 4 is a simplified flow chart representing a Write command arriving from an upper layer (e.g., file system layer) to the cache agent 18. For non-accelerated virtual disks 38 and 48, the Write command arrives at the cache agent 18, and passes the command to a production volume 52, thereby acting as transparent layer. For accelerated disks 38 and 48, if a "cache on write" policy is configured, data are sent to the SSD 40 via the WRITE CACHE primitive and to the production volume 52 simultaneously. If, no "cache on write" policy is implemented, the cache agent 18 sends the CHECK primitive to the SSD 40. If the data exist in the SSD 40, it sends an INVALIDATE primitive to invalidate this data segment.

Additionally, every write command sent to the cache agent 18 is also sent to the virtual disk 38 or 48. Hence, data are always placed in the external (SAN or NAS) that hosts the virtual disk 38 or 48. As a result, a full copy of the virtual machines 12 and 14 data always resides in external storage, allowing volume migration and protection from power failure. In other words, the caching is done in "write-through" mode.

Figure 5:
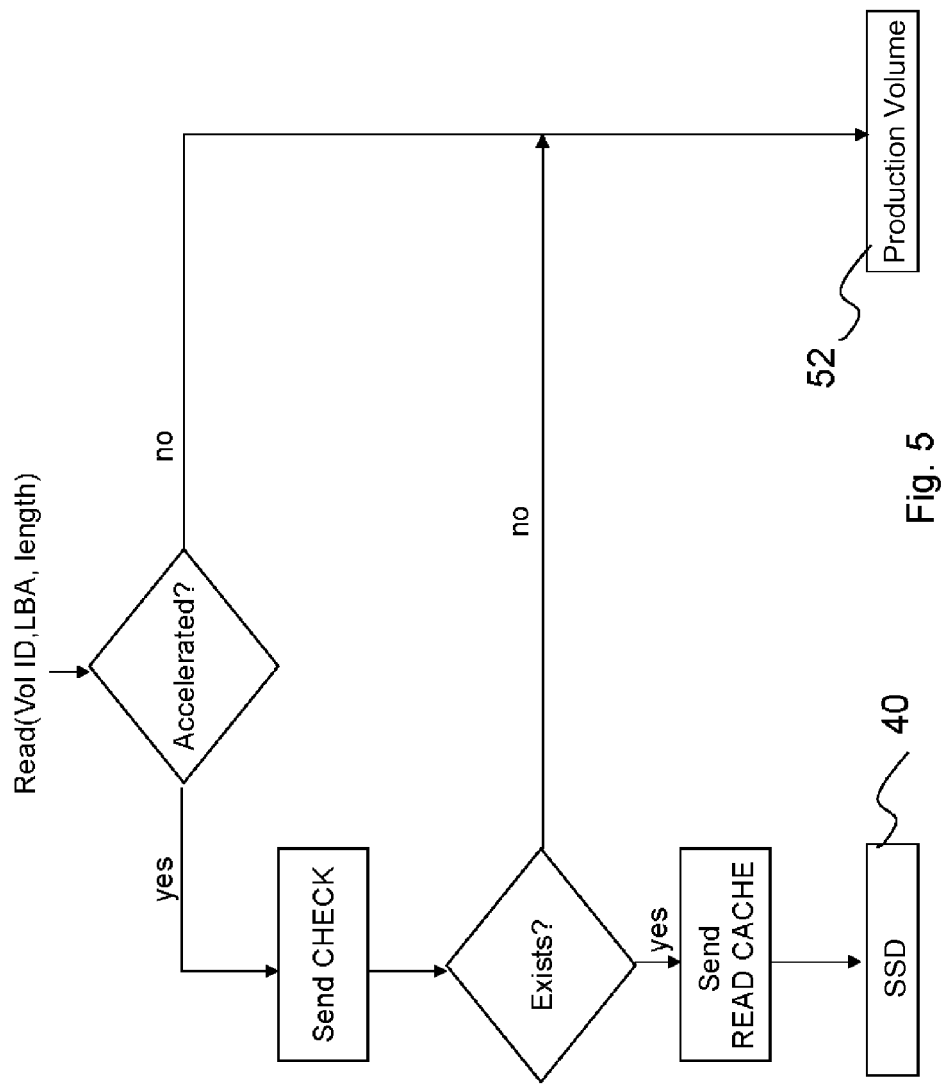
FIG. 5 is a flow chart representing a read operation in a cache agent in accordance with an aspect of the present invention.

FIG. 5 illustrates a simplified flow chart representing a Read command arriving from an upper layer (e.g., file system layer) to the cache agent 18. When the Read command arrives at the cache agent 18 for non-accelerated volumes on virtual disks 38 and 48, it passes the command to the production volume 52 and hence acts as transparent layer. For accelerated volumes on virtual disks 38 and 48, it sends the CHECK primitive to the SSD 40 to see if the data segment exists in the cache. If the data segment resides in the cache, it sends the READ CACHE primitive to the SSD 40. If the data segment does not reside in the cache, in the case of a cache miss, the cache agent 18 sends the command to the production volume 52.

If only a part of the requested segment (but not all of it) resides in the cache, the cache agent 18 can retrieve the available part from the cache via the READ CACHE primitive and retrieve the missing part from the production volume 52.

Figure 6:
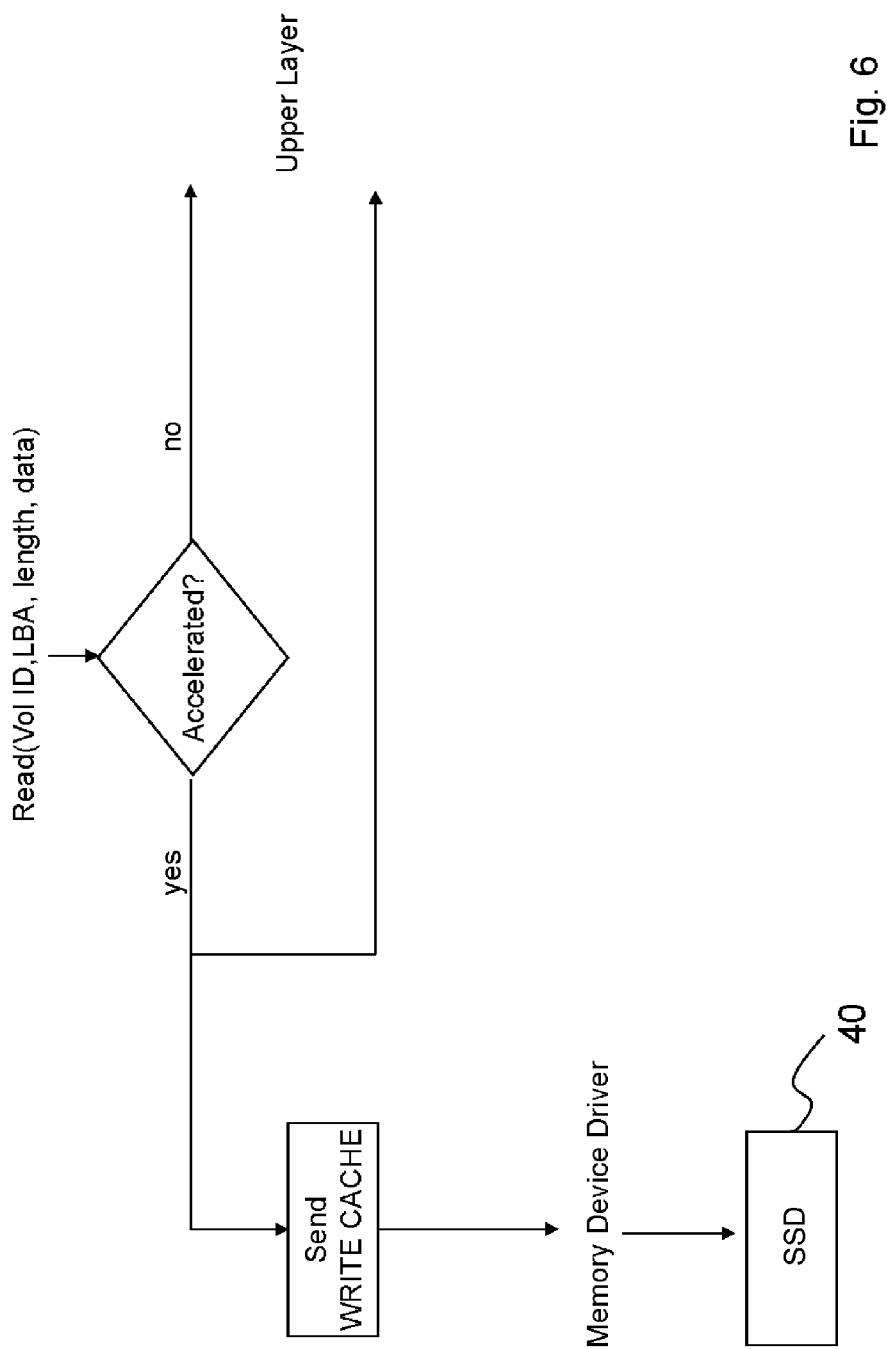
FIG. 6 is a flow chart representing a read callback in a cache agent in accordance with an aspect of the present invention.

FIG. 6 illustrates a simplified flow chart representing a Read command callback arriving from the production volume 52 with missing data. If a read callback arrives at the cache agent 18 from the production volume 52 for non-accelerated volumes on virtual disks 38 and 48, the cache agent 18 sends the data upward and simply acts as transparent layer. For accelerated virtual disks 38 and 48, the data are sent to upper layers as well as the SSD 40 via the WRITE CACHE primitive simultaneously.

Figure 7:
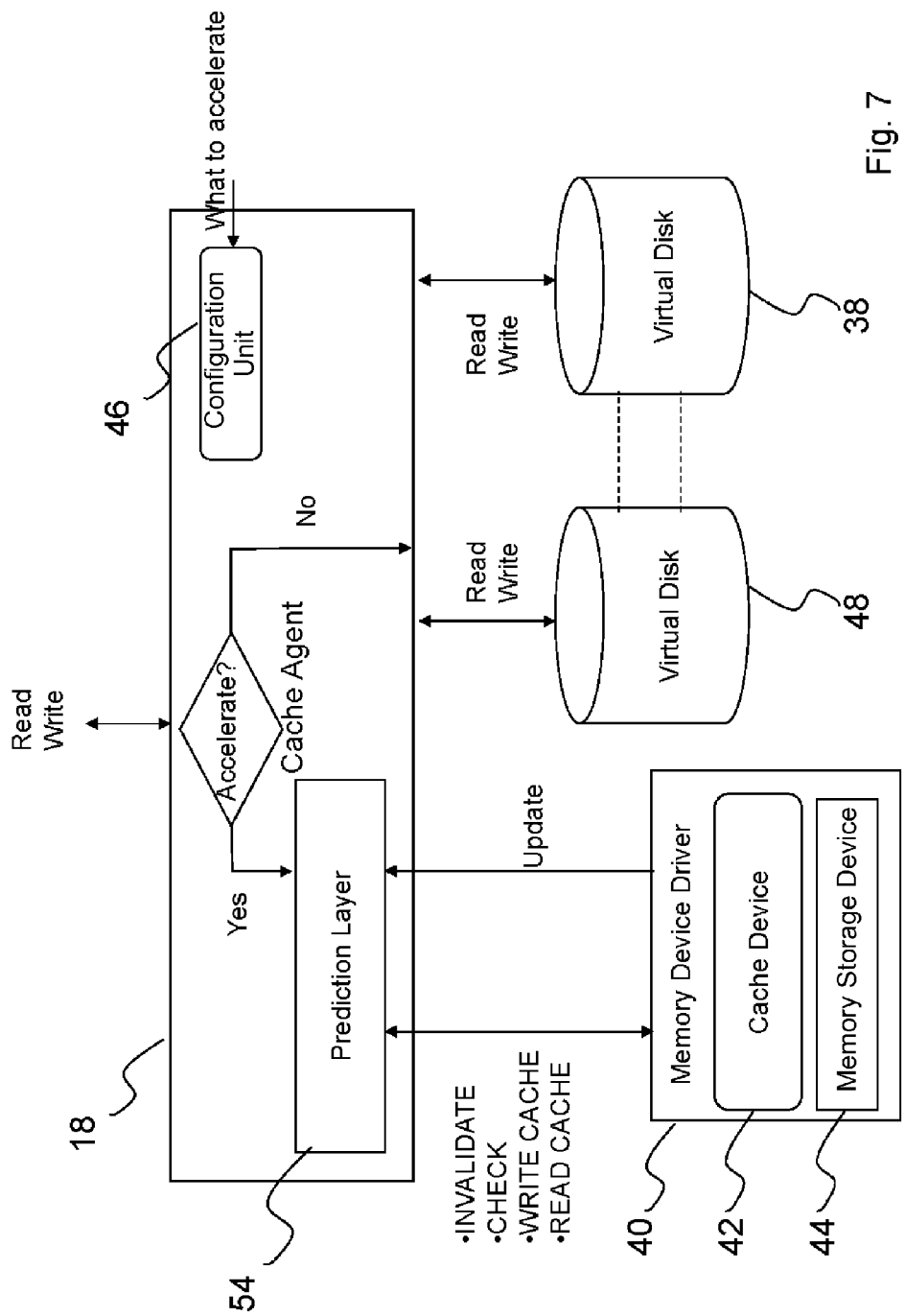
FIG. 7 is a block diagram and flow sketch representing a prediction layer in a cache agent in accordance with an aspect of the present invention.

FIG. 7 is a block diagram representing the cache agent 18 having a configuration unit 46 to determine what kind of data should be accelerated and making an according determination whether data are accelerated or not. Non-accelerated data are sent to local virtual disks 38 and 48 whereas accelerated data are forwarded to a prediction layer 54 capable of predicting whether a data segment resides in the SSD 40 thereby reducing queries sent to the SSD 40 to query for data existence in the cache.

The prediction layer 54 has a bitmap image (not illustrated) that represents the logical space of the accelerated virtual disk 38 or 48 with page granularity (e.g., bits for 16K page size). When a segment of data is sent to the SSD 40 to be placed in the cache device 42, the bits for the segments are set. Accordingly, if the corresponding bits in the prediction layer's 54 bitmap are not set, then the requested segments are not in the cache, which prohibits the use of the EXIST primitive (i.e., it can be concluded that the data do not exist in the cache) and reroutes the request to fetch the data from the production volume 52. If the corresponding bits are set, the requested segments may be in the cache (i.e., they were sent to the SSD 40 and could have been cached). In this case, the cache agent 18 can assume that the data are in the cache and can send the READ CACHE primitive to the SSD 40. The response to the READ CACHE primitive can be a "fail" response, as the data may have not been cached or may have already been removed from the cache; however, this scenario has a relatively low probability. Most likely, data will reside in the cache and the READ CACHE request will return a "success" response.

The SSD 40 also sends update information to the prediction layer 54 to identify data segments that were sent to the SSD 40 but were not cached or were previously removed from the cache. This information is sent periodically, for example, every minute, in the background in order not to load the cache agent 18. Hence, the probability of the READ CACHE returning a "fail" further decreases.

Figure 8:
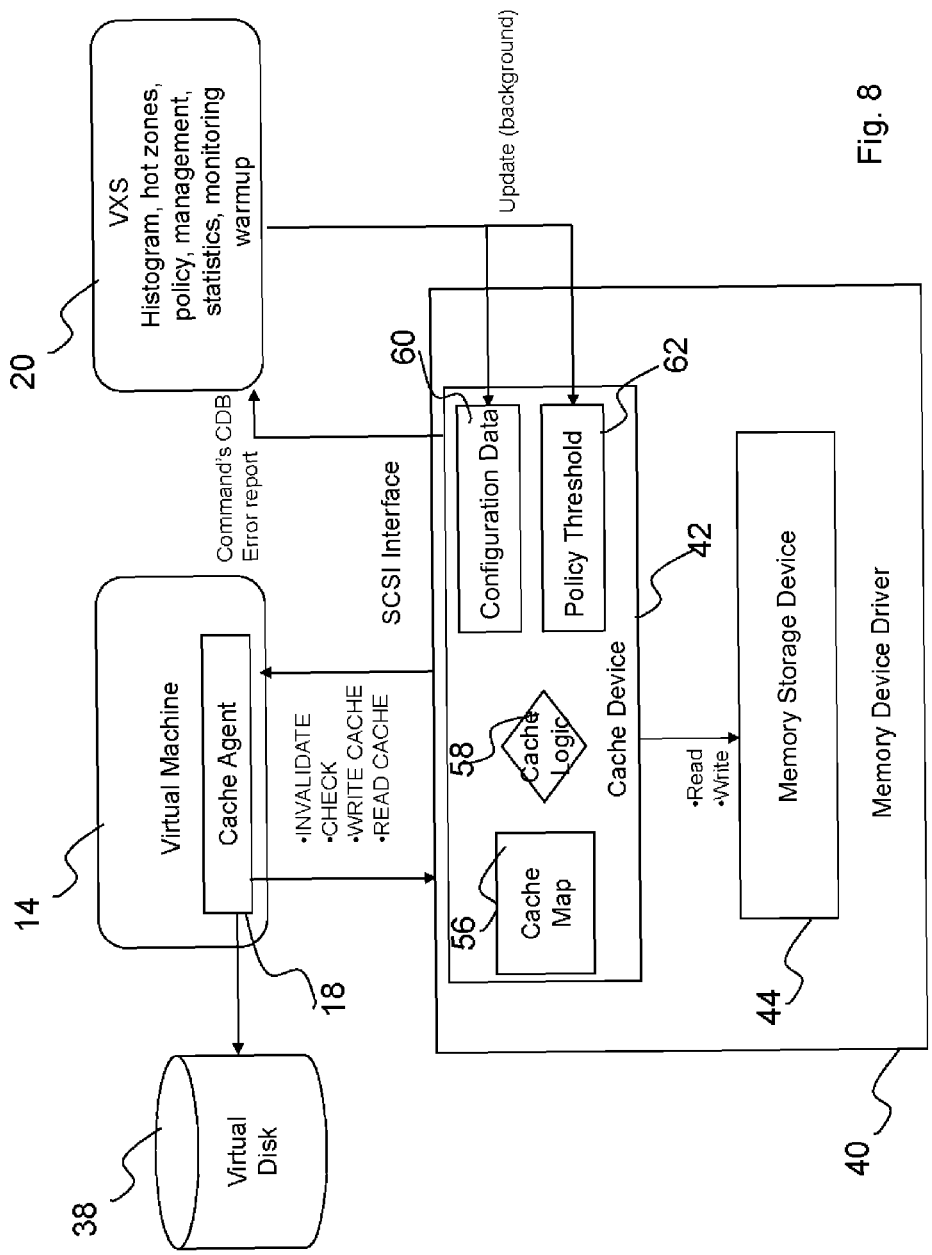
FIG. 8 is a block diagram and flow sketch representing a memory device driver, a cache agent and a VXS in accordance with an aspect of the present invention.

FIG. 8 is a block diagram representing communications between the accelerated virtual machine 14 with cache agent 18, SSD 40 and VXS 20. The SSD 40 may receive cache primitives from the cache agent 18 located in a virtual machine 14. The VXS 20 may also communicate with the SSD 40 to send and receive control path information via vendor specific commands.

The VXS 20 may receive offline a list of the command descriptor blocks (CDB) sent to the SSD 40 from the accelerated virtual machine 14. The VXS 20 processes these CDBs to provide information back to the SSD 40. This information includes histograms of the workload, finding "hot" zones, i.e., zones in the address space that are used more frequently and hence should be placed in the cache. The VXS 20 may be adapted to use this information to provide offline processing of information for cache operation. The VXS 20 can process the control path data (i.e., CDBs) to provide statistics and other information to a management server, discussed hereinafter, to provide a visual or other readable format of the processed data for rule-base activation and graphical presentation to an administrator. The VXS 20 may further be adapted to provide cache management and policy enforcement via this workload information.

As represented in FIG. 8, the cache device 42 module may include a non-persistent cache map 56 (i.e., metadata information), a cache logic 58 module, configuration data 60 and information for a policy threshold 62 (i.e., histogram and analysis).

The cache device 42 may be a software layer (driver) that has block device interface and supports the caching primitives. The cache logic 58 is implemented as a software module in the host's kernel and the cache map 56, the configuration data 60 and the policy threshold 62 are located in the host's memory.

Alternatively, the cache device 42 may be a thin driver interface in the host's kernel and the cache map 56 and cache logic 58 may be implemented in hardware, for example, located in the non-volatile memory storage device 44.

Another alternative may be adapting the cache device 42 as a driver interface in the host's kernel, with hardware assistance (i.e., hardware engines located in the non-volatile memory storage device 44) for implementing the cache map 56 and the cache logic 58.

The cache logic 58 may maintain data in a page granularity, for example 16 KByte pages. The page size can be varied according to configuration data 60 to suit to a physical flash page or other hardware or software optimal value.

Additionally, the cache logic 58 may implement any suitable cache algorithm and metadata. For example, direct mapping of the data, N-way (e.g., 4 way) associative mapping or fully associative mapping.

The cache logic 58 may use the information provided by the VXS 20 for the decision of what data to place in the cache and remove from the cache. The decision is based on the command's zone temperature as measured by the VXS 20. This will ensure that the data path 34 from the virtual machine 14 through the cache agent 18 and cache device 42 to the actual non-volatile memory storage device 44 is not loaded with any calculations of histograms, statistics and decision making, and therefore adds no overhead latency to the data path 34.

As a corollary, the cache algorithm in the cache device 42 may use central information to provide shared and dynamic cache services to a plurality of accelerated virtual machines, such as virtual machines 12 and 14, over several host server computer systems and their respective hypervisors.

The cache map 56 may be used as a way of finding the data in the cache, for example through tags. The policy threshold 62 defines how much data a volume may contain, that is, the level of fill, before the volume is subjected to garbage collection for the purpose of deleting invalid data. In other words, as soon as the policy threshold is reached, cache eviction through garbage collection is triggered. The configuration data 60 include ID, name and size of each volume and may also contain the time stamp of each cached data segment.

Figure 9:
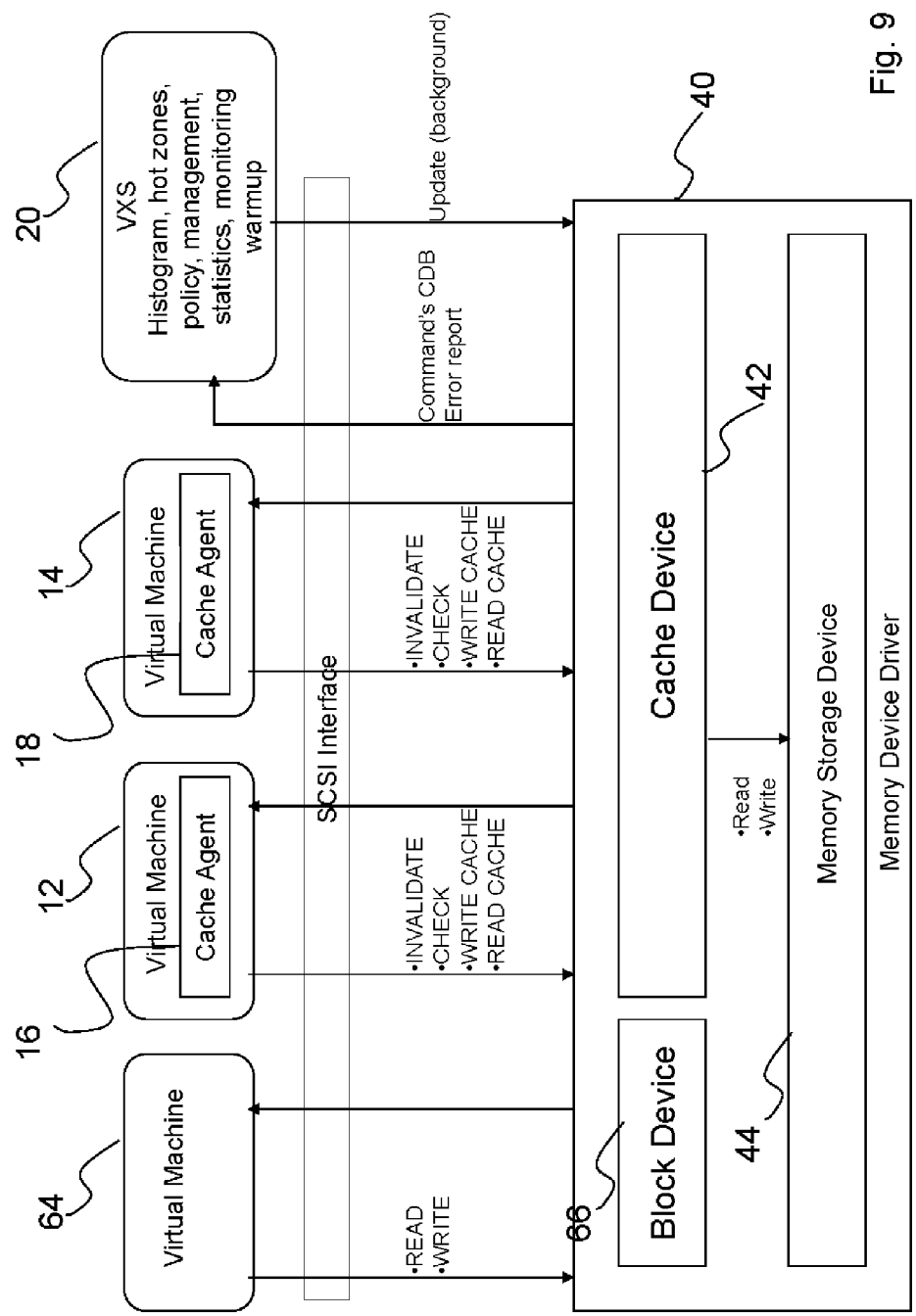
FIG. 9 is a block diagram representing accelerated and non-accelerated virtual machines and their flow with a memory device driver in accordance with an aspect of the present invention.

FIG. 9 illustrates a block diagram of a heterogeneous virtual space with accelerated virtual machines 12 and 14 assigned to cache agents 16 and 18, respectively, and a non-accelerated virtual machine 64 without any cache agent.

The SSD 40 may be adapted to serve a plurality of the accelerated virtual machines 12 and 14 via cache primitives through the cache device 42 and also a plurality of the non-accelerated virtual machines 64 via standard block device commands (read and write) and a block device 66 interface. Here, the non-volatile memory storage device 44 is partitioned via a-priori configuration into two partitions, a block device volume and a cache volume.

Figure 10:
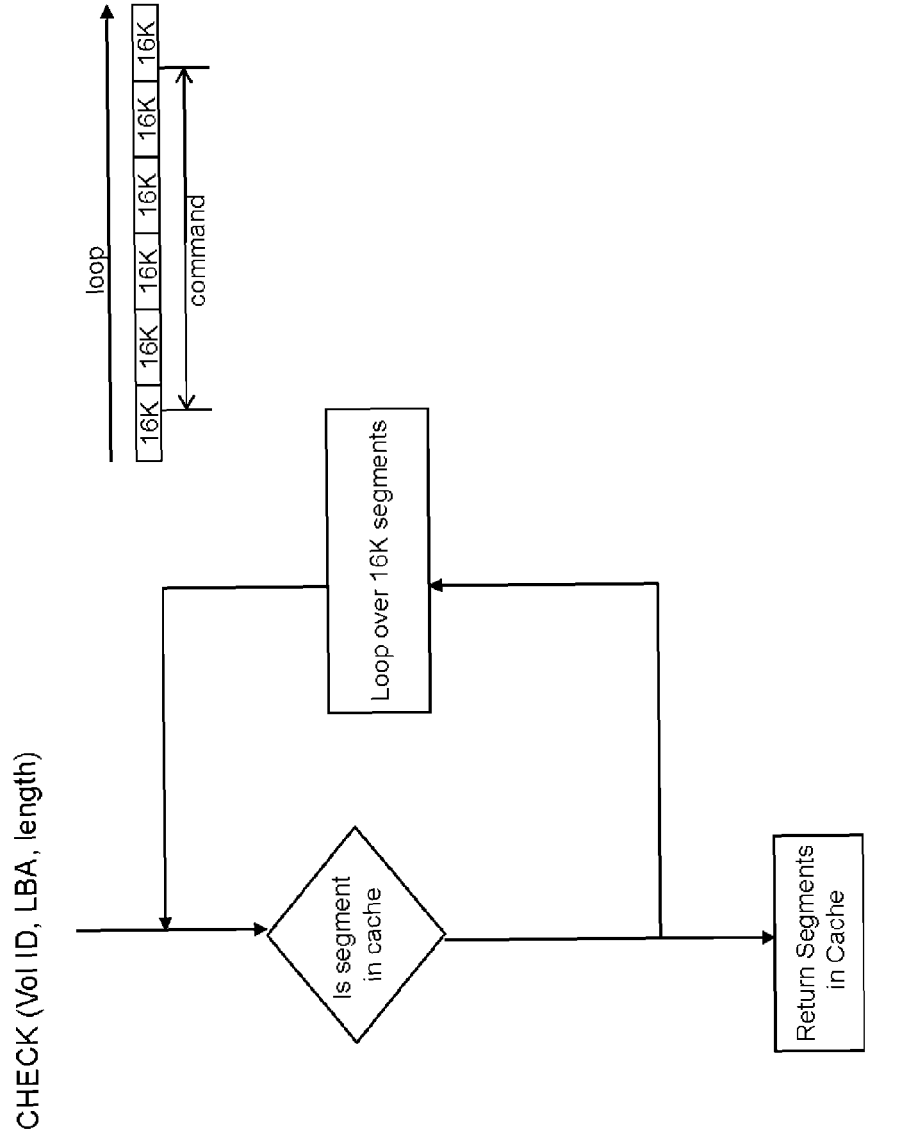
FIG. 10 is a flow chart representing a CHECK primitive operation in a SSD in accordance with an aspect of the present invention.

FIG. 10 illustrates the flow of the CHECK primitive in the cache device 42. The CHECK primitive is processed in the cache device 42 via a loop over the aligned pages (where a page can be 8K, 16K or any other size associated with the size of non-volatile memory storage device 44) of the requested segment. Each page is checked to see if it resides in the cache device 42 and the assembled result is returned.

Figure 11:
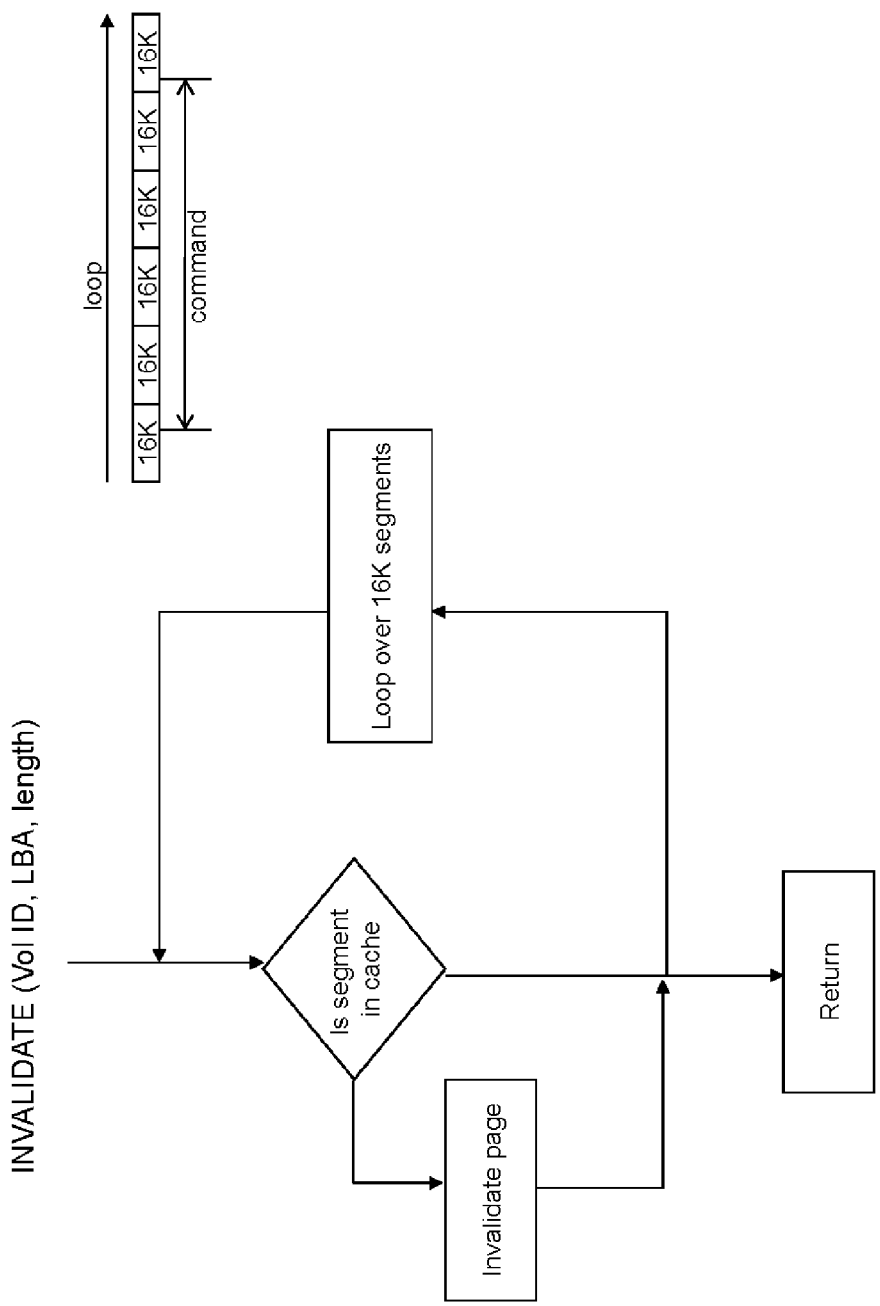
FIG. 11 is a flow chart representing a INVALIDATE primitive operation in a SSD in accordance with an aspect of the present invention.

FIG. 11 illustrates the flow of the INVALIDATE primitive in the cache device 42. The INVALIDATE primitive is processed in the cache device 42 via a loop over the aligned pages (where a page can be 8K, 16K or any other size associated with the size of the non-volatile memory storage device 44) of the requested segment. Each page is checked to see if it resides in the cache device 42 and if so, it is removed from the cache device 42. After all pages are checked and invalidated (if needed), the result is returned.

Figure 12:
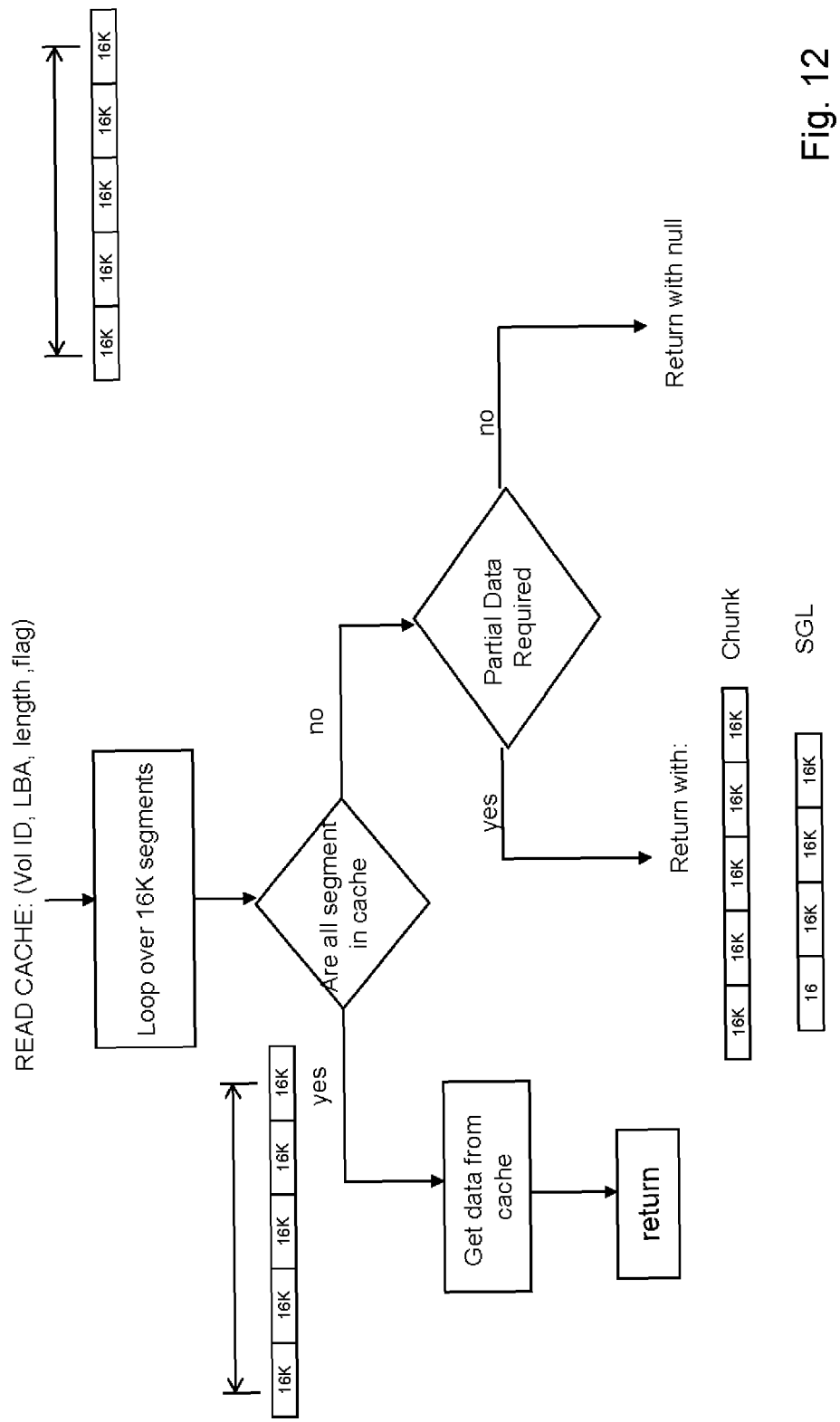
FIG. 12 is a flow chart representing a READ CACHE primitive operation in a SSD in accordance with an aspect of the present invention.

FIG. 12 shows the flow of the READ CACHE primitive in the cache device 42. The READ CACHE primitive is processed in the cache device 42 via a loop over the aligned pages (where a page can be 8K, 16K or any other size associated with the size of the non-volatile memory storage device 44) of the requested segment. Each page is checked to see if it resides in the cache device 42 and, if so, the data requested are returned in a chunk. The READ CACHE primitive can return a full segment only if it exists; otherwise it will return a partial segment (parts of the requested segment that exist in the cache device 42) according to a directive in the READ CACHE primitive.

The partial segment of data can be in two forms, either two consecutive chunks or a scattered gather list (SGL) of chunks as represented in FIG. 12. While two consecutive chunks can be retrieved with two IO requests (one from the non-volatile memory storage device 44 and one from the virtual disk 38), SGL may be placed with multiple IO requests. Therefore, the SGL is preferably retrieved with one IO from the virtual disk 38 to reduce retrieval time.

Figure 13:
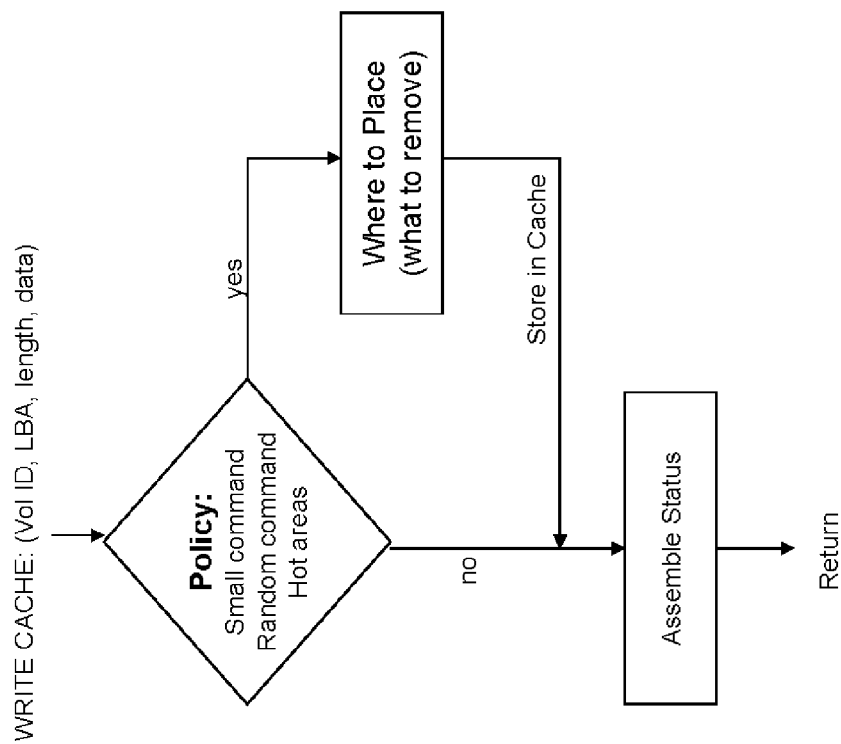
FIG. 13 is a flow chart representing a WRITE CACHE primitive operation in a SSD in accordance with an aspect of the present invention.

FIG. 13 illustrates the flow of the WRITE CACHE primitive in the cache device 42. The WRITE CACHE primitive is processed in the cache device 42 via a loop over the pages (where a page can be 8K, 16K or any other size associates with the size of the non-volatile memory storage device 44) of the requested segment (data segment is provided aligned). Each page is checked according to the volume's policy to see if it should be placed in the cache. This policy is driven by information that is processed in the VXS 20 and sent to the cache device 42. If the segment should be placed in the cache, it is decided where in the cache to place the data (and hence what existing data to remove). This decision is based on counters of recent usage, bank insertion policy (in case of N-Way cache algorithm) and other optimizations. The assembled status (what parts of the data segment were inserted to the cache) is returned.

Figure 14:
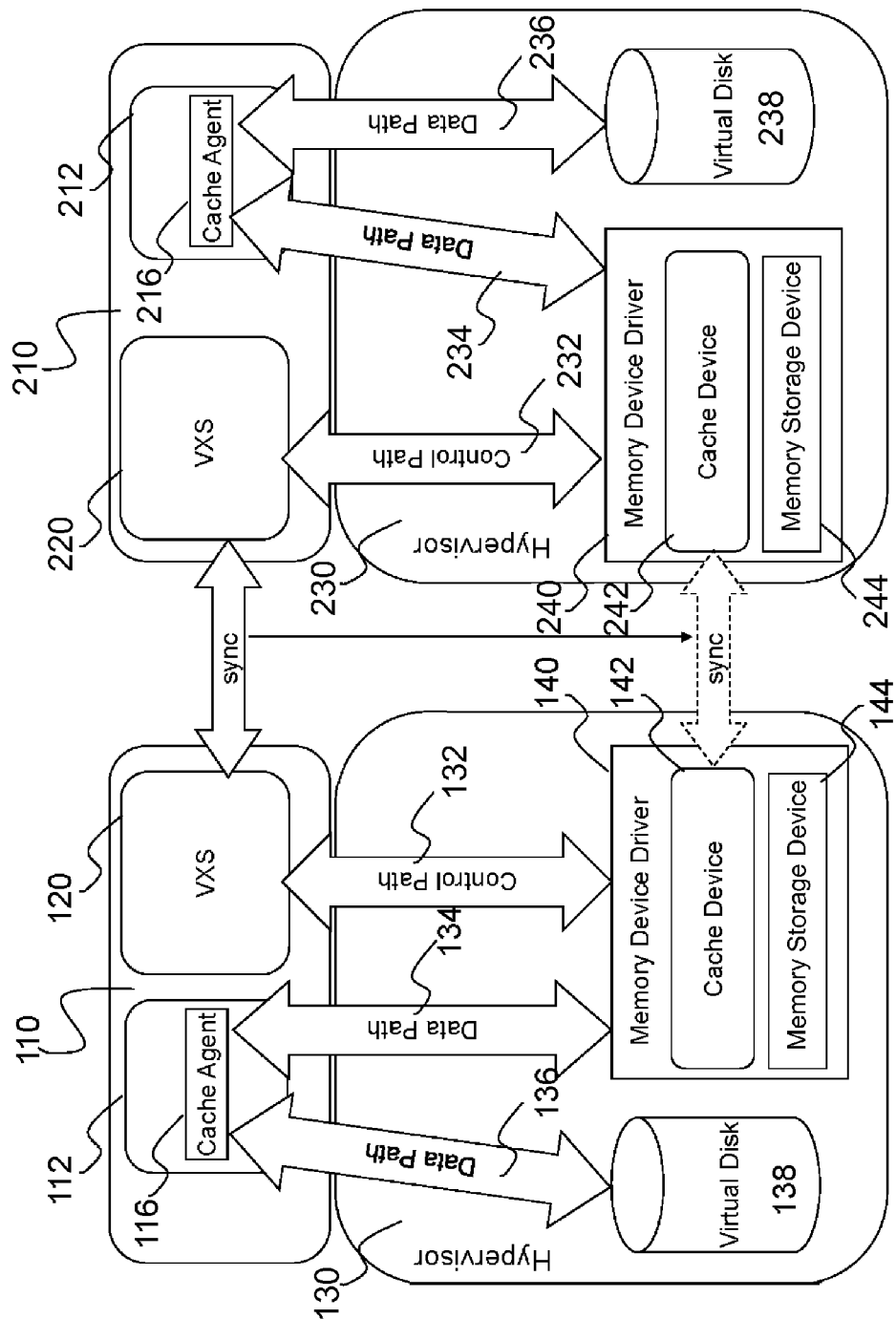
FIG. 14 is a block diagram and flow chart representing synchronization communications between two host server computer systems via their VXS servers in accordance with an aspect of the present invention.

FIG. 14 depicts an additional configuration of the virtual environment in accordance with a further embodiment of the present invention. In this figure, consistent reference numbers are used, if possible, to identify the same or functionally equivalent elements, but with numerical prefixes (1 and 2) added to distinguish this particular embodiment from the embodiment of FIG. 1. Specifically, FIG. 14 illustrates the synchronization flow between two SSDs 140 and 240 via the conjoint VXS 120 and 220. A host server computer system running a hypervisor 130 inside a virtual space architecture 110 includes a VXS 120 and a virtual machine 112 with a cache agent 116. A second host server computer system running a hypervisor 230 inside a virtual space architecture 230 includes a VXS 220 and a virtual machine 212 with a cache agent 216. VXS 120 and 220 communicate via an IP network. The hypervisor 130 includes a virtual disk 138 and a SSD 140 that further includes a cache device 142, a non-volatile memory storage device 144 and a memory device driver. The cache agent 116 communicates with the virtual disk 138 and SSD 140 via data paths 136 and 134 respectively and VXS 120 communicates with SSD 140 via a control path 132. The hypervisor 230 includes a virtual disk 238 and SSD 240 that further includes a cache device 242, a non-volatile memory storage device 244 and a memory device driver. Cache agent 216 communicates with the virtual disk 238 and SSD 244 via data paths 234 and 236, respectively and VXS 220 communicates with SSD 244 via a control path 232.

The VXS 120 and 220 functionally couple the hypervisors 130 and 230 in order to synchronize migration of virtual machines. Therefore, in order to share the cache information of SSD 140 with SSD 240, VXS 120 retrieves the cached metadata (list of logical addresses and lengths) from SSD 140 and sends it to VXS 220. VXS 220 then sends the metadata to SSD 240. As a result, if the virtual machine 112 migrates into the virtual space architecture 210, its cached data can be retrieved immediately without having to re-populate the cache from scratch, thereby allowing it to continue with its "hot" data cached.

While the invention has been described in terms of specific embodiments, it is apparent that other forms could be adopted by one skilled in the art. For example functionally equivalent memory technology may supersede the NAND flash memory taught in this disclosure and multiple forms of networking could be used to functionally couple the physical servers. Therefore, the scope of the invention is to be limited only by the following claims.

The invention claimed is:

1. A host server computer system comprising:
 a hypervisor within a virtual space architecture running at least one virtualization, acceleration and management server and at least one virtual machine;
 at least one virtual disk that is read from and written to by the at least one virtual machine;
 a cache agent residing in the at least one virtual machine, wherein the cache agent intercepts read or write commands made by the at least one virtual machine to the at least one virtual disk; and
 a solid state drive comprising a non-volatile memory storage device, a cache device and a memory device driver providing a cache primitives application programming interface to the cache agent and a control interface to the at least one virtualization, acceleration and management server, the cache primitives application programming interface being configured to check data status in the cache device, read and write data from and to the cache device, and invalidate data in the cache device, the control interface being configured to receive and send metadata information between the cache device and the at least one virtualization, acceleration and management server and to send management directives from the at least one virtualization, acceleration and management server to the cache device.

2. The system of claim 1, wherein the cache agent in the at least one virtual machine is adapted to accelerate operation of the at least one virtual machine by using the non-volatile memory storage device for caching data read from the at least one virtual disk in the solid state drive, retrieving cached data from the solid state drive, caching data written to the at least one virtual disk in the solid state drive and writing data to the at least one virtual disk.

3. The system of claim 1, wherein the cache agent is adapted to provide both file system acceleration and block level acceleration.

4. The system of claim 1, wherein the cache agent includes a prediction layer adapted to predict whether data segments reside in the solid state drive.

5. The system of claim 1, wherein the at least one virtualization, acceleration and management server is adapted to provide offline processing of metadata information obtained from the cache device via the control interface.

6. The system of claim 1, wherein the at least one virtualization, acceleration and management server is adapted to provide offline processing and statistics for central management for rule-base activation and graphical presentation to an administrator.

7. The system of claim 1, wherein the cache device is adapted to provide shared and dynamic caching services to a plurality of virtual machines on the system.

8. The system of claim 1, wherein the at least one virtualization, acceleration and management server is adapted to provide cache management and policy enforcement using the management directives sent to the cache device based on the metadata information obtained from the cache device.

9. The system of claim 1, wherein the solid state drive is adapted to provide a block device interface and a cache device interface.

10. The system of claim 1, wherein the solid state drive is adapted to serve both accelerated virtual machines and non-accelerated virtual machines.

11. The system of claim 1, wherein the non-volatile memory storage device is NAND flash-based memory technology.

12. A method of accelerating, migrating and synchronizing virtual machines across a network of functionally connected host server computer systems, each host server computer system comprising a hypervisor within a virtual space architecture with at least one virtual machine, at least one virtualization, acceleration and management server to accelerate the at least one virtual machine, at least one virtual disk to be written to and read from by the at least one virtual machine, a cache agent residing in the at least one virtual machine, wherein the cache agent intercepts read or write commands made by the at least one virtual machine to the at least one virtual disk, and a solid state drive including a non-volatile memory storage device, a cache device and a memory device driver to provide access to the solid state drive by the hypervisor via a cache primitives application programming interface and a control interface, the method comprising the steps of:
 detecting migration of a virtual machine from a first host server computer system to a second host server computer system with a virtualization, acceleration and management server of the first host server computer system;
 informing a virtualization, acceleration and management server of the second host server computer system of the migration of the virtual machine with the virtualization, acceleration and management server of the first host server computer system;
 performing invalidation, via the control interface of the first host server computer system, of cache information of the virtual machines that migrated from the first host server computer system to the second host server computer system to maintain coherency of cache information during transfer of the cache information; and then,
 transferring cache information from the control interface of a cache device of the first host server computer system with the virtualization, acceleration and management server of the first host server computer system to a cache device of the second host server computer system with the virtualization, acceleration and management server of the second host server computer system, wherein transferring of the cache information includes locating cached data in the cache device of the second host server computer system such that the cached data is immediately retrievable without the second host server computer system having to re-populate the cached data.

13. The method of claim 12, further comprising a step of accelerating operation of the at least one virtual machine with the cache agent in the at least one virtual machine by using the non-volatile memory storage device for caching data read from the at least one virtual disk in the solid state drive, retrieving cached data from the solid state drive, caching data written to the at least one virtual disk in the solid state drive and writing data to the at least one virtual disk.

14. The method of claim 12, further comprising a step of providing both file system acceleration and block level acceleration with the cache agent.

15. The method of claim 12, further comprising a step of predicting whether data segments reside in the solid state drive with a prediction layer residing in the cache agent.

16. The method of claim 12, further comprising a step of providing offline processing of metadata information obtained from the cache device via the control interface for cache operation with the at least one virtualization, acceleration and management server.

17. The method of claim 12, further comprising a step of providing offline processing and statistics for central management for rule-base activation and graphical presentation to an administrator with the at least one virtualization, acceleration and management server.

18. The method of claim 12, further comprising a step of providing shared and dynamic caching services to a plurality of virtual machines on the network with the cache device.

19. The method of claim 12, further comprising a step of providing cache management and policy enforcement using management directives sent to the cache device by the at least one virtualization, acceleration and management server based on metadata information obtained from the cache device.

20. The method of claim 12, further comprising a step of providing both block device interfacing services and cache device interfacing services with the solid state drive.

21. The method of claim 12, further comprising a step of serving both accelerated virtual machines and non-accelerated virtual machines on the network with the solid state drive.

22. The method of claim 12, further comprising a step of synchronizing the cached data in two different host server computer systems of the functionally connected host server computer systems and enabling migration of a virtual machine between the two different host server computer systems without loss of cache coherency with the virtualization, acceleration and management servers of the two different host server computer systems.

23. A system of at least two host server computer systems interconnected by a network, each of the at least two host server computer systems comprising:
- a hypervisor within a virtual space architecture running at least one virtualization, acceleration and management server, at least one virtual machine, and at least one virtual disk that is read from and written to by the at least one virtual machine;
- a cache agent residing in the at least one virtual machine, wherein the cache agent intercepts read or write commands made by the at least one virtual machine to the at least one virtual disk; and
- a solid state drive comprising a non-volatile memory storage device, a cache device and a memory device driver providing a cache primitives application programming interface to the cache agent and control interface to the at least one virtualization, acceleration and management server, the cache primitives application programming interface being configured to check data status in the cache device, read and write data from and to the cache device, and invalidate data in the cache device, the control interface being configured to receive and send metadata information between the cache device and the at least one virtualization, acceleration and management server and to send management directives from the at least one virtualization, acceleration and management server to the cache device, wherein the virtualization, acceleration and management server is adapted to functionally couple the at least two host server computer systems to synchronize migration of a virtual machine and a virtual disk from a first of the at least two host server computer systems to a second of the at least two host server computer systems while maintaining the coherency of the cache devices in the first and second of the at least two host server computer systems.

24. The system of claim 23, wherein the cache agent in the at least one virtual machine is adapted to accelerate operation of the at least one virtual machine by using the non-volatile memory storage device for caching data read from the at least one virtual disk in the solid state drive, retrieving cached data, caching data written to the at least one virtual disk in the solid state drive and writing data to the at least one virtual disk.

25. The system of claim 23, wherein the cache agent is adapted to provide both file system acceleration and block level acceleration.

26. The system of claim 23, wherein the cache agent includes a prediction layer adapted to predict whether data segments reside in the solid state drive.

27. The system of claim 23, wherein the at least one virtualization, acceleration and management server is adapted to provide offline processing of metadata information obtained from the cache device via the control interface.

28. The system of claim 23, wherein the at least one virtualization, acceleration and management server is adapted to provide offline processing and statistics for central management for rule-base activation and graphical presentation to an administrator.

29. The system of claim 23, wherein the cache device is adapted to provide shared and dynamic caching services to a plurality of virtual machines on the network.

30. The system of claim 23, wherein the at least one virtualization, acceleration and management server is adapted to provide cache management and policy enforcement using the management directives sent to the cache device based on the metadata information obtained from the cache device.

31. The system of claim 23, wherein the at least one virtualization, acceleration and management server is adapted to synchronize cache data and enable migration of virtual machines between the at least two host server computer systems without loss of cache coherency.

32. The method of claim 5, wherein the at least one virtualization, acceleration and management server makes processed metadata information available to the cache device via the control interface.

33. The method of claim 16, further comprising making processed metadata information available to the cache device via the control interface.

34. The system of claim 26, wherein processed metadata information is made available to the cache device via the control interface.

* * * * *